United States Patent
Boyd et al.

(10) Patent No.: US 7,455,779 B2
(45) Date of Patent: Nov. 25, 2008

(54) PROCESS FOR SELECTIVE REMOVAL AND IMMOBILIZATION OF CONTAMINANTS FROM SPENT SORBENTS

(75) Inventors: Owen E. Boyd, Holliston, MA (US); Paul Sylvester, Waltham, MA (US)

(73) Assignee: Layne Christensen Company, Mission Woods, KS (US)

( * ) Notice: Subject to any disclaimer, the term of this patent is extended or adjusted under 35 U.S.C. 154(b) by 485 days.

(21) Appl. No.: 11/289,081

(22) Filed: Nov. 29, 2005

(65) Prior Publication Data

US 2007/0023358 A1    Feb. 1, 2007

Related U.S. Application Data

(60) Provisional application No. 60/631,766, filed on Nov. 30, 2004.

(51) Int. Cl.
*C02F 1/28* (2006.01)

(52) U.S. Cl. .................. 210/672; 210/688; 210/912

(58) Field of Classification Search ............. 210/672, 210/688, 912
See application file for complete search history.

(56) References Cited

U.S. PATENT DOCUMENTS

| 4,383,980 | A | * | 5/1983 | Dines | ............. 423/54 |
| 4,432,944 | A | * | 2/1984 | Elliott | ............. 423/7 |
| 4,816,233 | A | * | 3/1989 | Rourke et al. | ....... 423/21.5 |

* cited by examiner

*Primary Examiner*—Matthew O Savage
(74) *Attorney, Agent, or Firm*—Thompson Hine LLP

(57) ABSTRACT

Contaminated drinking water and other liquids are decontaminated by contact with sorbents to remove toxic contaminants such as arsenic, as well as non-toxic contaminants. In regenerating the spent sorbents, the waste stream contains both toxic and non-toxic contaminants but only toxic components must be treated as hazardous waste and subjected to strict regulations for disposal. The inventive method regenerates spent sorbents in a process that minimizes the amount of hazardous waste for disposal. The bulk of contaminants are non-toxic and are first selectively removed from the spent sorbent, generating a non-hazardous waste stream. Toxic contaminants are then removed from the sorbent, generating a hazardous waste stream. Because the bulk of contaminants was removed in the first waste stream, the lower concentration of toxic contaminants in the second waste stream requires less material (e.g., ion exchange resin) for hazardous waste decontamination and disposition.

26 Claims, No Drawings

PROCESS FOR SELECTIVE REMOVAL AND IMMOBILIZATION OF CONTAMINANTS FROM SPENT SORBENTS

This application claims priority to U.S. Pat. Application No. 60/631,766, filed on Nov. 30, 2004.

FIELD OF THE INVENTION

The invention is directed to a method to regenerate sorbents used in decontamination processes, minimizing solid waste disposal volume.

BACKGROUND

Liquid streams containing non-toxic and toxic contaminants may be decontaminated by contact with a sorbent to which the contaminants bind. The spent sorbent must then pass the Toxicity Characteristic Leaching Procedure (TCLP) to meet regulatory and other requirements to be classified as a non-hazardous waste.

To improve the economics of decontaminating a liquid stream, spent sorbents are typically regenerated so that they can be reused. The spent sorbents may be treated with an alkaline solution that will strip all contaminants (toxic and non-toxic) from the sorbent. The inert, non-toxic contaminants that are also released may be at concentrations several orders of magnitude greater than the toxic contaminants released. The waste stream resulting from sorbent regeneration therefore contains relatively low (e.g., mg/L) concentrations of toxic contaminants in comparison to the relatively high (e.g., g/L) concentrations of non-toxic contaminants, but is still classified as hazardous waste.

Decontaminating this hazardous waste stream by contact with an ion exchange resin or other sorbent to remove all of the contaminants in solution is not cost effective. Most of the available capacity of the resin will be occupied by the non-toxic contaminants, which are present at higher concentrations in the waste stream. This process requires a greater volume of resin to remove all the toxic contaminants and to render the waste stream non-hazardous.

Other methods are thus desirable.

SUMMARY OF THE INVENTION

Spent sorbents to which toxic contaminants (e.g., arsenic) are bound more strongly than non-toxic contaminants (e.g., sulfates) are regenerated. These sorbents are used to decontaminate potable water and other liquids.

In one embodiment, the spent sorbent is contacted with a first wash solution that selectively removes less strongly bound non-toxic contaminants from the sorbent. This results in a non-hazardous waste stream that is readily disposed of by conventional disposal methods, and a partially treated sorbent. The partially treated spent sorbent is then contacted with a second wash solution that removes substantially all the remaining contaminants, which includes the more strongly bound toxic contaminants. This results in a hazardous waste stream that can be treated with a lower volume of material (e.g., ion exchange resin) for hazardous waste decontamination because the bulk of contaminants (the non-toxic contaminants) were removed in the first waste stream. This in turn reduced the volume of solid waste for ultimate disposal and minimized hazardous waste disposal costs.

In another embodiment, spent sorbents that bind toxic contaminants more strongly than non-toxic contaminants are regenerated by treating with a first wash solution under conditions to selectively elute less strongly bound non-toxic contaminants, then treating with a second wash solution under conditions to selectively elute more strongly bound contaminants. Additional second wash solutions may be applied to the sorbent to selectively concentrate toxic contaminants in a specific waste stream. The toxic contaminants may be retained on a solid support, reducing the volume of hazardous solid waste for disposal.

In another embodiment, a spent hydrous metal oxide sorbent or a spent hybrid sorbent is first contacted with a carbonate containing solution that has been buffered to a pH in excess of the point of zero charge (PZC) of the sorbent. At such a pH, the charge on the sorbent changes from positive to negative, causing the less strongly bound contaminants to be released into the wash solution. The more strongly bound contaminants (toxic contaminants) remain on the sorbent, and can be selectively removed using a solution that is more alkaline than the first solution.

These and other advantages will be apparent in light of the following detailed description and examples.

DETAILED DESCRIPTION

Toxic contaminants include, but are not limited to, arsenic, vanadium, molybdenum, uranium, and selenium. Non-toxic contaminants include, but are not limited to, sulfate, bicarbonate, and silicate. A contaminated stream is broadly defined as any liquid stream containing any contaminants (non-toxic and/or toxic). One example is potable water. Another example is cooling water, e.g., water used as a coolant in manufacturing processes. Another example is industrial effluents. These examples are non-limiting, and other examples are known to one skilled in the art.

A sorbent is a material that removes a contaminant by one or more ion exchange, adsorption, absorption, chemisorption, chelation, and precipitation process(es). Sorbent is a general term for materials used to decontaminate liquid streams. The inventive selective elution process is applicable to a wide range of sorbents, including metal oxides and ion exchange resins. A spent sorbent is one that has been used in a decontamination process, regardless whether its full sorption or binding capacity has been utilized. The methods may be used to regenerate any sorbent that selectively binds one species (e.g., toxic contaminants) more strongly than another species (e.g., non-toxic contaminants). Examples of such sorbents include, but are not limited to, a hydrous metal oxide sorbent (e.g., Bayoxidee® 33, Bayer Chemicals AG, Germany), a hybrid sorbent (e.g., a hydrous metal oxide on the surface of, or throughout, a polymer matrix; ArsenX$^{np}$ (SolmeteX, Northboro Mass.)).

A spent sorbent to be regenerated is first contacted with a first wash solution under conditions sufficient to remove or strip the less strongly bound contaminants from the sorbent. The contaminants removed in the resulting waste stream are non-toxic contaminants, due to the sorbent's stronger binding of the toxic contaminants. In one embodiment, a chloride-containing solution is used. Examples include ammonium chloride, Group I alkali metal chlorides, and/or Group II alkaline earth metal chlorides (e.g., sodium chloride, potassium chloride, lithium chloride, rubidium chloride, cesium chloride, magnesium chloride, calcium chloride, beryllium chloride, strontium chloride, barium chloride, etc.). The concentration of the chloride-containing solution ranges from about 1%$^{w/v}$ to about 25%$^{w/v}$.

In another embodiment, a nitrate-containing solution is used. Examples include ammonium nitrate, Group I alkali metal nitrates, and/or Group II alkaline earth metal nitrates (e.g., sodium nitrate, potassium nitrate, lithium nitrate, rubidium nitrate, cesium nitrate, magnesium nitrate, calcium nitrate, beryllium nitrate, strontium nitrate, or barium nitrate). The concentration of the nitrate-containing solution ranges from about $1\%^{w/v}$ to about $25\%^{w/v}$.

In another embodiment, sodium bicarbonate and sodium carbonate buffered at a pH greater than the point of zero charge (PZC) of the sorbent is used. The PZC can be determined experimentally, or an approximate value can be found in the appropriate scientific literature. PZC is a value of the negative logarithm of the activity in the bulk of the charge-determining ions. A surface charge of the sorbent is at its PZC when the surface charge density is zero. At a pH greater than PZC, the charge on the sorbent changes from positive to negative, causing the more weakly bound anionic contaminants (e.g., sulfate, bicarbonate, silicate) to be released into the wash solution. The more strongly bound contaminants (e.g., arsenic, vanadium, molybdenum, selenium) are then selectively removed, as is subsequently described, using a wash solution that is more alkaline than the first wash solution.

In another embodiment, a Group I alkali metal bicarbonate/carbonate buffered solution is used at a concentration of about $0.1\%^{w/v}$ to about $20\%^{w/v}$.

The first wash solution selectively removed the less strongly bound non-toxic contaminants, resulting in a first waste stream containing substantially non-toxic contaminants, and a partially treated sorbent. The first waste stream is classified as non-hazardous waste. It can be disposed of by simple and economic methods known to one skilled in the art; there are no hazardous waste precautions, disposal requirements, etc. Alternatively, it can be reused to treat additional spent sorbent.

The partially treated sorbent is then contacted with a second wash solution. The second solution is sufficiently strong to strip contaminants that were strongly bound to the sorbent, which included the toxic contaminants and any residual non-toxic contaminants that were not removed in the first waste stream. In one embodiment, a Group I alkali metal hydroxide solution is used (e.g., lithium hydroxide, sodium hydroxide, potassium hydroxide, etc.). In another embodiment, a slurry of a Group II alkaline earth metal hydroxide is used (e.g., beryllium hydroxide, magnesium hydroxide, calcium hydroxide, strontium hydroxide, etc.). In another embodiment, ammonium hydroxide is used. The concentration of the hydroxide-containing second wash solution ranges from about $0.1\%^{w/v}$ to about $20\%^{w/v}$. Treatment with the second wash solution results in a second hazardous waste stream containing these toxic contaminants.

In one embodiment, the second wash solution may additionally contain a chloride- and/or nitrate-containing first wash solution. This facilitates conditioning of the regenerated sorbent prior to reuse.

The second waste stream is treated with an ion exchange material to immobilize the toxic contaminants onto a solid substrate. The ion-exchange material may be contained on a column, it may be a powder, etc. Examples of ion exchange materials include high capacity anion exchange materials such as hydrotalcite (Alcoa) or similar layered double hydroxides (LDHs) of the general formula $[M^{2+}_{(1-x)}M^{3+}_{x}(OH)_2][^{x}/_{n}A^{n-}.mH_2O]$ where $M^{2+}$ and $M^{3+}$ are divalent and trivalent cations, respectively; x is equal to the ratio $M^{3+}/(M^{2+}+M^{3+})$ and A is an anion of charge n (e.g. Metall:X (SolmeteX, Inc., Northboro Mass.)). Because the bulk of the contaminants (non-toxic species) were removed in the first waste stream, the volume of the ion exchange material needed to retain contaminants (mostly toxic species) in the second waste stream was reduced.

The invention will be further appreciated with reference to the following illustrative, non-limiting examples using a sample of ArsenX$^{np}$ that had been used to treat a groundwater contaminated with arsenic and vanadium.

EXAMPLE 1

Six bed volumes of $15\%^{w/v}$ NaCl solution were passed through a column of spent sorbent at a flow rate of about five bed volumes/hour or less. This process removed less strongly bound sulfate and carbonate non-toxic contaminants from the liquid. The waste stream was analyzed and contained 0.2 mg/l of arsenic, 0.2 mg/l of vanadium, 6.5 mg/l of silicon, and 3390 mg/l of sulfate. This first waste stream was thus classified as non-hazardous.

Six bed volumes of $2\%^{w/v}$ NaOH/$1\%^{w/v}$ NaCl solution were then passed through the same column of partially treated sorbent at a flow rate of about two bed volumes/hour. This process removed the bulk of the more strongly bound contaminants (e.g., arsenic, vanadium). This second waste stream was thus classified as hazardous.

The waste stream was then adjusted to pH 7.1 with hydrochloric acid and filtered to remove any precipitated silica. The neutralized waste stream was analyzed and contained 65 mg/l of sulfate, 13 mg/l of vanadium, 80 mg/l of arsenic, and 130 mg/l of silicon.

The neutralized hazardous waste stream was passed through a column of anion exchange material to sequester the arsenic and vanadium ions. The resultant waste stream was non-hazardous, simplifying its disposal. The anion exchange material containing the toxic contaminants was configured to pass TCLP requirements as known to one skilled in the art, making it suitable for direct disposal.

EXAMPLE 2

The method of Example 1 was followed except that the second wash solution was $2\%^{w/v}$ NaOH.

EXAMPLE 3

The method of Example 1 was followed except that the first wash solution was $5\%^{w/v}$ sodium bicarbonate which had been adjusted to pH 10 with sodium hydroxide to produce a sodium carbonate/sodium bicarbonate buffered solution. Six bed volumes of this solution were then passed through a column of ArsenX$^{np}$, a hybrid sorbent of hydrous iron oxide impregnated into a porous polymer bead. A pH 10 was greater than the PZC (or isoelectronic point) of ArsenX$^{np}$. This treatment removed the bulk of the less strongly absorbed silicon and sulfate contaminants, but left the more strongly bound contaminants (arsenic and vanadium) on the resin beads. Consequently, the wash solution was classed as non-hazardous. More strongly bound contaminants, i.e., toxic contaminants, were then removed from the sorbent using the second wash solution as described in Example 1.

EXAMPLE 4

The method of Example 1 was followed except that sufficient powdered sorbent or anion exchange material, e.g. Metall:X, was added to the neutralized waste to sorb all of the contaminants. The mixture was then stirred for up to six hours, filtered, and the resultant liquid was discharged as non-hazardous waste. The sorbent was selected so as to pass TCLP regulations.

Other variations or embodiments of the invention will also be apparent to one of ordinary skill in the art from the above description and examples. Thus, the forgoing embodiments are not to be construed as limiting the scope of this invention.

What is claimed is:

1. A method for minimizing a volume of hazardous waste for disposal comprising:
   a. contacting a spent sorbent used in a liquid stream decontamination process, the sorbent binding toxic contaminants more strongly relative to non-toxic contaminants, with a first solution selected from at least one of a chloride-containing solution, a nitrate-containing solution, a bicarbonate solution buffered at a pH greater than a point of zero charge of the sorbent, or an alkaline bicarbonate solution, under conditions sufficient to selectively remove relatively weaker bound contaminants from the sorbent resulting in a partially treated sorbent and a first non-hazardous waste stream;
   b. contacting the partially treated sorbent with at least one hydroxide-containing solution under conditions sufficient to remove relatively stronger bound contaminants from the sorbent, resulting in a regenerated sorbent and a hazardous waste stream containing substantially toxic contaminants, and
   c. contacting the hazardous waste stream with a minimal volume of a material for binding the toxic contaminants under conditions to retain the toxic contaminants, resulting in a second non-hazardous waste stream and a minimal volume of hazardous waste.

2. The method of claim 1 wherein the toxic contaminants are selected from the group consisting of arsenic, vanadium, uranium, molybdenum, selenium, and combinations thereof.

3. The method of claim 1 wherein the non-toxic contaminants are selected from the group consisting of sulfate, bicarbonate, silicate, and combinations thereof.

4. The method of claim 1 wherein a concentration of the chloride-containing solution ranges from about $1\%^{w/v}$ to about $25\%^{w/v}$.

5. The method of claim 1 wherein a concentration of the nitrate-containing solution ranges from about $1\%^{w/v}$ Ito about $25\%^{w/v}$.

6. The method of claim 1 wherein a concentration of the alkaline bicarbonate solution ranges from about $0.1\%^{w/v}$ to about $20\%^{w/v}$.

7. The method of claim 1 where the pH of the alkaline bicarbonate solution is between pH 7 and pH 14.

8. The method of claim 1 wherein a concentration of the hydroxide-containing solution ranges from about $0.1\%^{w/v}$ to about $20\%^{w/v}$.

9. The method of claim 1 wherein the chloride containing solution is selected from at least one of ammonium chloride, sodium chloride, potassium chloride, lithium chloride, rubidium chloride, cesium chloride, magnesium chloride, calcium chloride, beryllium chloride, strontium chloride, or barium chloride.

10. The method of claim 1 wherein the nitrate containing solution is selected from at least one of ammonium nitrate, sodium nitrate, potassium nitrate, lithium nitrate, rubidium nitrate, cesium nitrate, magnesium nitrate, calcium nitrate, beryllium nitrate, strontium nitrate, or barium nitrate.

11. The method of claim 1 wherein the hydroxide containing solution is selected from at least one of ammonium hydroxide, sodium hydroxide, potassium hydroxide, lithium hydroxide, rubidium hydroxide, cesium hydroxide, magnesium hydroxide, calcium hydroxide, beryllium hydroxide, strontium hydroxide, or barium hydroxide.

12. The method of claim 1 wherein step b is repeated a plurality of times.

13. The method of claim 1 wherein the first solution is sodium bicarbonate/sodium carbonate buffered at about pH 10.

14. The method of claim 1 wherein the binding material is an anion-exchange resin or powder.

15. The method of claim 1 wherein the binding material is at least one of hydrotalcite or layered double hydroxides.

16. The method of claim 1 wherein the liquid stream is at least one of potable water, industrial effluent, or cooling water.

17. A regeneration process for a toxic and non-toxic contaminant-loaded spent sorbent, the sorbent binding toxic contaminants more strongly relative to non-toxic contaminants, the method comprising treating the sorbent with a first solution under conditions to selectively elute less strongly bound non-toxic contaminants resulting in a partially treated sorbent, and thereafter treating the sorbent with a second hydroxide solution under conditions to selectively elute more strongly bound toxic contaminants resulting in a regenerated sorbent.

18. The process of claim 17 wherein the sorbent is at least one of a hydrous metal oxide sorbent or a hybrid sorbent.

19. The process of claim 17 further comprising a plurality of treatments with the second solution to selectively concentrate toxic contaminants in an effluent stream.

20. The process of claim 17 wherein treating with the first solution produces a non-hazardous waste stream containing substantially non-toxic contaminants.

21. The process of claim 17 wherein treating with the second solution produces a hazardous waste stream containing substantially toxic contaminants.

22. The process of claim 17 wherein the second solution is selected from at least one of an alkali metal hydroxide, an alkaline earth metal hydroxide, or an ammonium hydroxide solution.

23. The process of claim 17 wherein the concentration of the second solution ranges from about $0.1\%^{w/v}$ to about $20\%^{w/v}$.

24. The process of claim 17 wherein the second solution further comprises chloride, nitrate, or combinations thereof.

25. A method to minimize the volume of hazardous waste for disposal in a process to decontaminate a potable water stream using a sorbent that strongly binds arsenic, the method comprising a. contacting a spent sorbent that strongly binds arsenic used to decontaminate a potable water stream with a first solution under conditions sufficient to selectively remove relatively weaker bound contaminants from the sorbent, resulting in a partially treated sorbent and a first non-hazardous waste stream; b. contacting the partially treated sorbent with a second solution under conditions sufficient to remove arsenic from the sorbent, resulting in a regenerated sorbent and an arsenic containing waste stream, and c. contacting the arsenic containing waste stream with a minimal volume of an anion-exchange material thereby immobilizing arsenic in a minimal volume for disposal and generating a second non-hazardous waste stream.

26. The method of claim 25 whereby vanadium, molybdenum, uranium, selenium and combinations thereof strongly bind the sorbent.

* * * * *